United States Patent [19]

Harrison

[11] Patent Number: 5,024,377
[45] Date of Patent: Jun. 18, 1991

[54] VEHICLE HEATING SYSTEM

[76] Inventor: Frank Harrison, P.O. Box 1824, Kansas City, Mo. 64141

[21] Appl. No.: 467,570

[22] Filed: Jan. 19, 1990

[51] Int. Cl.⁵ .......................................... G05D 23/00
[52] U.S. Cl. .............................. 237/2 A; 237/12.3 B; 237/12.3 R
[58] Field of Search ............ 237/2 A, 12.3 R, 12.3 A, 237/12.3 B; 126/247; 122/26; 165/41

[56] References Cited

U.S. PATENT DOCUMENTS

| | | | |
|---|---|---|---|
| 3,996,999 | 12/1976 | Termont et al. | 165/41 |
| 4,352,456 | 10/1982 | Brandenburg, Jr. | 237/12.3 R |
| 4,728,029 | 3/1988 | Griebel et al. | 237/12.3 R |

FOREIGN PATENT DOCUMENTS 3201443  5/1983  Fed. Rep. of Germany ........ 165/41

*Primary Examiner*—Henry A. Bennet
*Attorney, Agent, or Firm*—Hovey, Williams, Timmons & Collins

[57] ABSTRACT

A vehicle heating system (10) utilizes transmission fluid from the vehicle transmission (12) as a source for heat exchange in heater core (26). Fan (28) blows the heated air to heater vents in the normal fashion. When the interior of the vehicle reaches a threshold temperature, thermostat (50) detects the threshold temperature and actuates solenoid (46) which in turn actuates valve (44) so that transmission fluid is diverted from transmission output route (24) to input conduit (30) for heating circulation through heater core (26). The fluid is circulated through output conduit (32), check valve (42), portions of transmission output route (24), and finally radiator (20) where the transmission fluid is cooled for another cycle. The transmission fluid is then returned to transmission (12) via transmission input route (22). In preferred forms, the system (10) provides valve (38), tee connector (34) and caps (36,40). Valve (38) is shifted to a second mode so that pressure may be connected to output conduit (32) where cap (40) is removed, such that fluid may be circulated in a direction opposite to the normal heating mode and discharged via the outlet where cap (36) is removed. When optimum cleaning of heater core (26) has been accomplished, the pressure is disconnected, caps (36,40) are reconnected and valve (38) is returned to its normal heating mode.

7 Claims, 1 Drawing Sheet

VEHICLE HEATING SYSTEM

BACKGROUND OF THE INVENTION

1. Field of the Invention

This invention relates to a vehicle heating system of simple yet highly effective design which has numerous advantages including greater heat generation, longer heater core life and prolonged life for the vehicle transmission system. More particularly, it is concerned with a vehicle heating system wherein transmission fluid is diverted from its cooling route and circulated through the heater core for heating the vehicle passenger compartment.

2. Description of the Prior Art

Most vehicles, particularly automobiles, circulate engine coolant through a heat exchanger for the purpose of heating the passenger compartment. The problem with such heating systems is that when the engine coolant is diverted from the radiator cooling route to the heater core, the chemical characteristics of the coolant cause corrosive and pollutive problems as it is circulated. In particular, the corrosive nature of typical coolants such as ethylene glycol results in leakage of the coolant out of the heater core, often into the passenger compartment resulting in frequent, costly heater system repairs and unpleasant and potentially unhealthy circumstances in the passenger compartment. Accordingly, the prior art points out the need for a system which can be easily retrofitted and yet provide a relatively noncorrosive liquid for heat transfer.

A number of systems for heating passenger compartments have been proposed in the past. In general, however, these units have not met the above-described needs. Patents illustrating these prior units include: U.S. Pat. Nos. 1,895,503, 2,531,019, 4,069,972, 4,136,824, 4,192,456, 4,346,839, 4,352,455, 4,370,956, 4,371,112, 4,368,735, 4,407,449, 4,432,493, 4,434,934, and 4,487,364.

SUMMARY OF THE INVENTION

The problems outlined above are in large measure solved by the vehicle heating system in accordance with the present invention. That is to say, the present system circulates transmission fluid through the heater core rather than engine coolant so that the above noted corrosion problems are obviated while at the same time providing augmented, advantageous cooling of the transmission fluid.

The vehicle heating system in accordance with the present invention broadly includes structure for cooling the transmission fluid, heat exchanger apparatus including conduits operably coupling the cooling structure thereto, and a diversion assembly operably coupled with the heat exchanger apparatus and the cooling structure to selectively divert transmission fluid when the passenger compartment of the vehicle is at an appropriate, predetermined temperature. The conduit structure allows for diversion and return of the transmission fluid from its normal cooling route through the radiator, and allows for easy retrofitting of extant, conventional heating units.

The thermostat controls the vehicle's passenger compartment air temperature only. The thermostat controls only the temperature in the passenger compartment. The thermostat has no bearing on the transmission fluid.

In particularly preferred forms, the system includes a three port service valve in the conduit structure along with a tee connector so that the heater core may be flushed by reversing the normal path of circulation through the conduit structure for optimum maintenance. When the cleaning procedure is completed the service valve is reset to its heating mode so that the normal direction of circulation is reestablished.

DESCRIPTION OF THE PREFERRED EMBODIMENT

Figure 1:
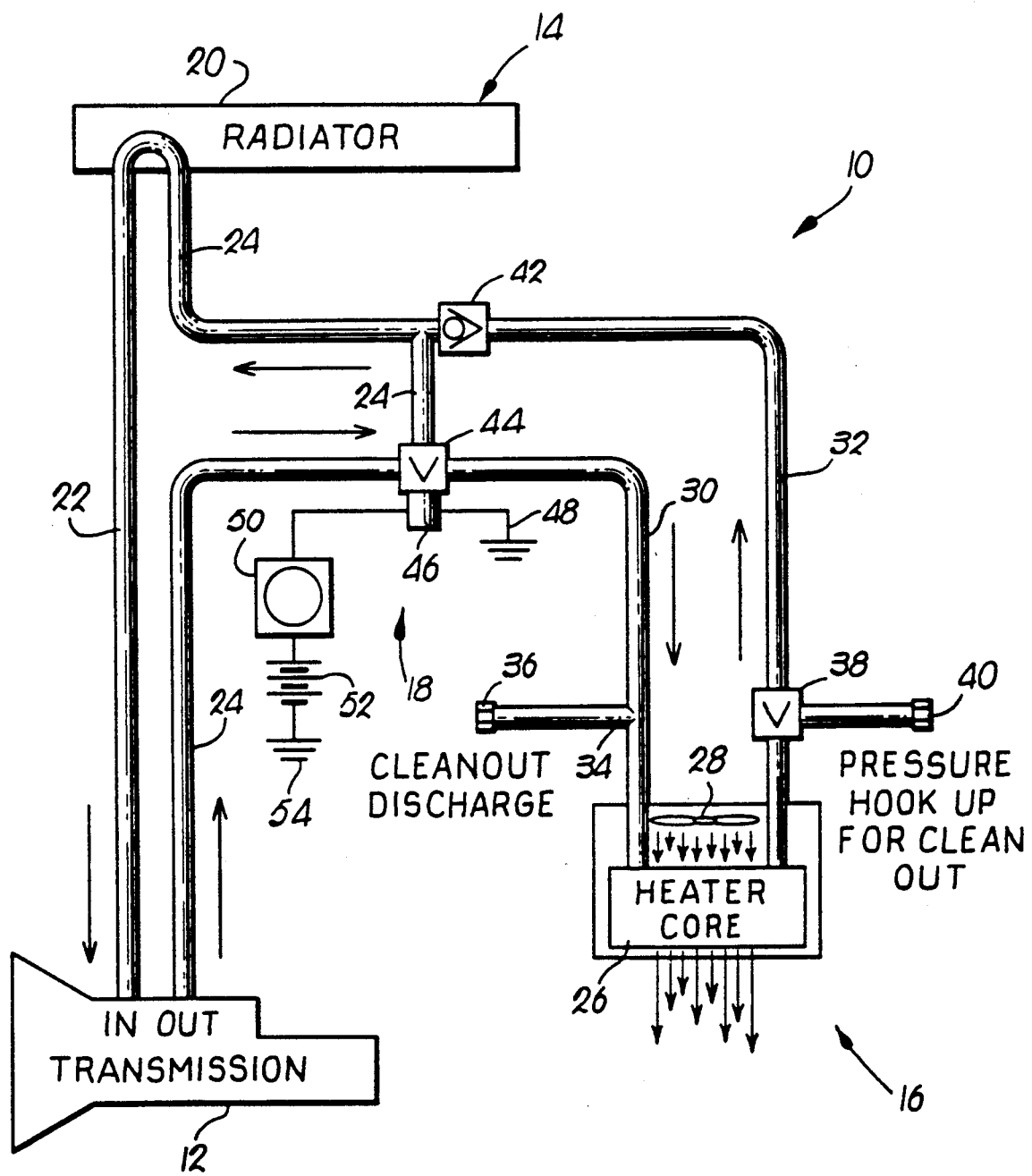
FIG. 1 is a schematic view of the preferred vehicle heating system in accordance with the present invention.

Referring now to the single drawing figure, a vehicle heating system 10 is shown coupled with an automatic transmission 12 of a vehicle. System 10 diverts heated transmission fluid for purposes of heating the vehicle's passenger compartment (not shown).

System 10 broadly includes cooling structure 14, heat exchanger apparatus 16, and diversion assembly 18. System 10 can either be manufactured and installed at the factory or can be installed with a retrofitting kit or the like.

In more detail, cooling structure 14 includes a radiator 20 of conventional design, a transmission input route 22 and a transmission output route 24. The routes 22, 24 are the conventional type of hosing and include appropriate seals and fasteners, as are well known in the art.

Heat exchanger apparatus 16 includes a heater core 26, fan 28, input conduit 30, output conduit 32, tee connector 34, cap 36, three-port valve 38, cap 40, and check valve 42. Check valve 42 is configured so that fluid may only pass from right to left as viewed in FIG. 1. Three-port valve 38 has two different modes so that fluid normally circulates from bottom to top in output conduit 32 in a first mode. A second mode of operation allows fluid to pass in the direction from cap 40 through valve 38 toward heater core 26. Heater core 26 and fan 28 are conventionally connected by appropriate structure to valving which can be controlled by one or more heating levers in the passenger compartment so that passengers may select heating and defrosting modes along with fan control.

Diversion assembly 18 includes a three-port valve 44 which, in a first mode, allows fluid to circulate in transmission output route 24 from the left, through valve 44 and upwardly toward radiator 20. In a second mode, valve 44 allows fluid to circulate from transmission output route 24 to input conduit 30, i.e. from left to right as viewed in FIG. 1. The valve is coupled with electric solenoid 46 which is grounded as at 48. Solenoid 46, which is of the normally closed type, is electrically coupled with electric thermostat 50 which in turn is powered by 12 volt dc battery 52, of the type conventionally found in an automobile, the battery 52 being grounded as at 54. Thermostat 50, when actuated, monitors the air temperature level within the passenger compartment.

In operation, transmission fluid such as a high weight of oil, is introduced into the transmission. Subsequently, when the vehicle is started, the transmission begins circulating fluid to radiator 20 via transmission output route 24. The fluid is cooled at radiator 20 and returned to transmission 12 via transmission input route 22. When the interior of the vehicle reaches a predetermined temperature, the thermostat 50 detects this temperature and actuates solenoid 46 which in turn shifts valve 44 from its first mode to its second so that transmission fluid flows from transmission 12 to heater core 26 rather than to radiator 20.

Those skilled in the art will readily appreciate that such a thermostatic-valving arrangement could also be incorporated at the transmission itself so that no diversion from the cooling apparatus 14 would be required. However, for retrofitting purposes, the valving and hosing arrangement as schematically drawn is believed to be the most economically feasible.

In any event, when diverted, the heated transmission fluid is routed to input conduit 30, then through heater core 26 and output conduit 32 and returned to transmission output route 24 via check valve 42. The fluid is circulated through transmission output route 24 into radiator 20 as indicated by the arrow (pointing left) and then returned to the transmission 12 via transmission input route 22 in the normal fashion. Thermostat 50 is also appropriately linked with levers (not shown) in the passenger compartment so that such diversion of transmission fluid is not effectuated unless desired by the passengers.

When transmission fluid is diverted through heater core 26, fan 28 is actuated to blow air through heater core 26 so that the heated air emerging from heater core 26, as viewed in FIG. 1, may be channeled to the appropriate heating or defrosting vents (not shown). Thus, the heating system takes advantage of the substitution of heated transmission fluid for engine coolant as a heat source within heater core 26. It will also be understood that in a retrofitting mode other connections from heater core 26 to the thermostat 50 would also be appropriately placed; however, this structure is not shown due to the fact that it is not necessary to the inventive concept.

It will readily be understood that a filter (not shown) may also be incorporated into input conduit 30 to filter the transmission fluid prior to its circulation within heater core 26 so as to avoid an undersirable build-up of dirt, debris and the like from the transmission fluid in heater core 26.

The heat exchanger apparatus 16 may be cleaned by the following procedure. The engine is turned off, cap 40 is removed and valve 38 is changed to its second mode so that fluid may circulate from the area where cap 40 is normally mounted through valve 38 into heater core 26. Cap 36 is also removed and then a source of fluid pressure is linked at output conduit 32 at the point at which cap 40 is normally mounted. The fluid is then forced in the reverse direction of normal heater core circulation, the fluid passing through the heater core 26, through tee connector 34 and out the point of tee connector 34 where cap 36 has been removed. Sufficient pressure is exerted for enough time to achieve the desired level of cleaning of heater core 26 and conduits 30, 32 at which point the source of pressure is disconnected, the valve 38 is reinstated to its original heat-circulating mode and caps 36, 40 are reconnected. At this point system 10 is again ready to function for heating purposes.

Those skilled in the art will appreciate the benefits to transmission 12 from the use of system 10. In particular, it will be noted that transmission fluid returns to transmission 12 in a cooler state due to the fact that the heat exchange which takes place in heater core 26 augments the cooling effect the transmission fluid experiences in radiator 20. It follows that radiator 20 and transmission 12 will experience longer lives due to the decreased burden to radiator 20 in terms of its cooling function as well as the lessened stress for transmission 12 when operating with cooler transmission fluid. In addition, it is well known that transmission fluid is heated to a greater degree in winter time due to the slippery traction often found in winter driving conditions. In effect, the system 10 is advantageously suited to capitalize on this phenomenon since wintertime is when heating system 10 will require the maximum heating source temperatures. Thus the present invention not only prolongs the life of critical components of the vehicle, but also provides a seasonally more effective heat source.

As those skilled in the art will also appreciate, the present invention encompasses many variations in the preferred embodiment described herein, for example, a fluid other than oil might be used. Also as noted above, the transmission fluid might be diverted directly from the transmission rather than the cooling apparatus.

I claim:

1. A heating system for a vehicle having a transmission with fluid, the system comprising:
   means for cooling the transmission fluid;
   heat exchanger means including conduit structure operably coupling said cooling means and transmission with said heat exchanger means for two-way fluid communication therebetween; and
   diversion means operably coupling said heat exchanger means with said cooling means and the transmission for selectively diverting transmission fluid when the fluid is placed in the transmission and the temperature of the interior of the vehicle reaches a predetermined minimum level, so that the heated transmission fluid is circulated through said heat exchanger means.

2. The vehicle heating system of claim 1, said diversion means including a valve interposed between and fluidly coupling said cooling means and said conduit structure.

3. The vehicle heating system of claim 2, wherein said valve includes an electric solenoid and said diversion means further includes a thermostat coupled to said valve.

4. The vehicle heating system of claim 1, said conduit structure including a heater core, an input conduit and an output conduit both of said conduits operably coupled with said heater core, said output conduit including a check valve.

5. The vehicle heating system of claim 4, said output conduit further including a three-port tee valve interposed between said heater core and said check valve, the third port of said tee valve being fluidically coupled to a cleaning nozzle.

6. The vehicle heating system of claim 5, said input conduit including a selectively openable tee connector.

7. A method of heating a vehicle passenger compartment, including the steps of:
   providing a vehicle having a passenger compartment, a transmission with transmission fluid therein, means for cooling the transmission fluid, heat exchanger means, and diversion means operably coupling said cooling means or said transmission with said heat exchanger means, for selectively diverting transmission fluid;
   monitoring the temperature of the interior of the vehicle;
   diverting the transmission fluid from said cooling means or said transmission when the temperature of the interior of the vehicle reaches a predetermined minimum level;
   heating air within said heater exchanger means by circulating the transmission fluid therein; and
   transferring heated air from said heat exchanger means to said passenger compartment.

* * * * *